US 6,735,586 B2

(12) United States Patent
Timmons (10) Patent No.: US 6,735,586 B2
(45) Date of Patent: May 11, 2004

(54) SYSTEM AND METHOD FOR DYNAMIC CONTENT RETRIEVAL

(75) Inventor: Michael Timmons, San Jose, CA (US)

(73) Assignee: Sybase, Inc., Dublin, CA (US)

( * ) Notice: Subject to any disclaimer, the term of this patent is extended or adjusted under 35 U.S.C. 154(b) by 348 days.

(21) Appl. No.: 09/780,993

(22) Filed: Feb. 8, 2001

(65) Prior Publication Data

US 2001/0044810 A1 Nov. 22, 2001

Related U.S. Application Data

(60) Provisional application No. 60/180,994, filed on Feb. 8, 2000, provisional application No. 60/219,156, filed on Jul. 19, 2000, and provisional application No. 60/246,674, filed on Nov. 7, 2000.

(51) Int. Cl.[7] ............................................... G06F 17/30
(52) U.S. Cl. ............................................... 707/3; 707/4
(58) Field of Search .............................. 707/1, 2, 3, 4, 707/5, 6, 7, 8, 9, 10, 104.1; 709/223, 202, 246, 219; 711/124

(56) References Cited

U.S. PATENT DOCUMENTS

| | | | |
|---|---|---|---|
| 5,649,186 A | | 7/1997 | Ferguson ...................... 707/10 |
| 5,761,662 A | | 6/1998 | Dasan .......................... 707/10 |
| 5,974,455 A | | 10/1999 | Monier ........................ 709/223 |
| 6,067,559 A | * | 5/2000 | Allard et al. ................ 709/202 |
| 6,408,360 B1 | * | 6/2002 | Chamberlain et al. ...... 711/124 |
| 6,430,624 B1 | * | 8/2002 | Jamtgaard et al. .......... 709/246 |
| 6,507,867 B1 | * | 1/2003 | Holland et al. .............. 709/219 |

FOREIGN PATENT DOCUMENTS

| | | | |
|---|---|---|---|
| EP | 0 834 822 A2 | 4/1998 | ........... G06F/17/30 |
| EP | 0 909 070 A2 | 4/1999 | ........... H04L/29/06 |

OTHER PUBLICATIONS

P. Ponnachath, M. Timmons, "Capturing Dynamic Content using CCL", 2000.*

Kistler, K., et al., "WebL—a programming language for the Web", *Computer Networks and ISDN Systems*, 1998, vol. 30, pp. 259–269.

Guarin, J. "Access By Content of Ducuments In An Office Information System", 11th International Conference on R&D (Information Retrieval), Jun. 13–15, 1988, pp. 629–649.

Ting et al., "Business Form Classification Using Strings", 13th International Conference On Pattern Recognition, Vienna Austria, vol. 2, 1996, pp. 690–694.

Fernandez–Panadero, M. et al., "Mass–Customization Electronic Journals", Electronic Publishing '99. 3rd Conference on Electronic Publishing, Ronneby Sweden, May 12, 1999, pp. 225–235.

Kistler, T. et al., WebL—A Programming Language For the Web, Computer Networks and ISDN Systems, 30, (1998), pp. 259–270.

* cited by examiner

*Primary Examiner*—Diane D. Mizrahi
*Assistant Examiner*—Yicun Wu (57) ABSTRACT

Systems and methods for collecting information distributed over a computer network are described. Problems addressed by the invention include the marking of content distributed over a network, the instant display of current information distributed over a network, and the retrieval of information at a browser without an intermediary step to save the information. The invention enables customized aggregation of content distributed over a network in real-time. The invention includes a recursive scripting language. Scripts in the recursive scripting language may be used to point dynamically to web objects whose URLs have changed. Embodiments include a feature extraction object used for identifying similar information objects. Feature Extraction may use 'fuzzy logic' to insure that targeted content is identified despite modifications in the source page.

16 Claims, 9 Drawing Sheets

SYSTEM AND METHOD FOR DYNAMIC CONTENT RETRIEVAL

RELATED APPLICATIONS

This application claims the benefit of priority of U.S. provisional patent application entitled, "Automated Real-Time Retrieval of Web Content", Ser. No. 60/180,994, having inventor Michael Timmons, filed Feb. 8, 2000; U.S. provisional patent application entitled, "One Click Capture", Ser. No. 60/219,156, having inventor Michael Timmons, filed Jul. 19, 2000, and U.S. provisional patent application entitled, "Method for Internet Searching Using One Click Search", Ser. No. 60/246,674, having inventor Michael Timmons, filed Nov. 7, 2000, all of which are hereby incorporated by reference in their entirety.

BACKGROUND OF THE INVENTION

1. Field of the Invention

This invention relates to the field of content retrieval. In particular, the invention relates to a computer system and method for dynamically identifying and retrieving content distributed over the Internet.

2. Description of the Related Art

The Internet comprises a vast number of computers and computer networks that are interconnected through communication links. The interconnected computers exchange information using various services, such as electronic mail, Gopher, and the World Wide Web ("WWW"). The WWW service allows a server computer system to send graphical Web pages of information to a remote client computer system. The remote client computer system can then display the Web pages. Each resource (e.g., computer or Web page) of the WWW is uniquely identifiable by a Uniform Resource Locator ("URL"). To view a specific web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the display of Web pages.

Currently, Web pages are typically defined using Hyper Text Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls and other features. The HTML document may contain URLs of other Web pages available on that server computer system or other server computer systems.

The WWW is made up of millions of 'web sites' with each site having a number of HTML pages. Each HTML page usually has a number of web objects on each page such as graphics, text and 'hyper text' references (URL's) to other HTML pages. There is a need to identify and retrieve dynamically updated content from diverse network sources.

SUMMARY OF THE INVENTION

The invention comprises systems and methods to facilitate the collection and distribution of information over a computer network. This invention solves several information management problems, such as the marking of content distributed over a network, the instant display of current information distributed over a network, and the retrieval of information at a browser without an intermediary step to save the information. As such, the invention enables customized aggregation of content distributed over a network in real-time.

This invention enables users to simultaneously view not only their favorite web sites, but their favorite parts of their favorite web sites, all within a single window. Individual users may employ the invention to collect portions or individual web pages which may be located at any web site. Corporate web designers and site managers can use this invention to mark and collect content from their own corporate intranet or from anywhere on the web. Information aggregators may use this invention to collect web-based information from one web site or from many web sites and 're-purpose' that content in a completely new form.

The invention may also be used to 'post process' the results of any search engine to display only 'quality' or 'desired' information, thereby eliminating a need for additional user mouse clicks, and simplifying the search process while improving the quality of search results.

The invention is equally applicable to the collection and re-purposing of XML net objects as well as audio objects such as MP3. The invention also has applications on the Internet as well as conventional communications systems such as voice telephony and in broadband communications.

Embodiments of the invention include a recursive scripting language, or "Content Collection Language" (CCL), for identifying and accessing objects distributed over the Internet. In embodiments of the invention, short scripts written in the scripting language are used in place or URLs: unlike URLs, which are designed for referencing static data, scripts written in the Content Collection Language may point to 'dynamic' data that is constantly updated. The CCL statement can be used just like a URL.

Embodiments of the invention include a feature extraction object used for identifying similar information objects. The invention makes it possible to divide and sort page contents from several pages into groups sharing similar attributes, which are contained in a Feature Extraction object. In this way information brokers and publishers can aggregate information from several sources into a new information object.

The invention includes systems and methods for reducing a web page to its smallest network objects and creating a Feature Extraction 'tag' or 'web fingerprint' of the object; this tag may be referenced again to find the object in the future. In embodiments of the invention, Feature Extraction uses 'fuzzy logic' to ensure that targeted content is identified and collected after a source page has been updated with fresh information or graphics.

As such, feature extraction may be used to perform any one or more of the following:

Divide any web page into its smallest parts or "atoms".

Given any desired object or its containers, to generate a symbolic 'Internet fingerprint' that is persistent and may be used as an alias pointing to the target object.

Use the Internet fingerprint to find the desired object even though the static URLs on its page have changed.

Provide a resilient and robust 'fingerprint' that can work well with missing rules.

Build a Feature Extraction tag of a target that is descriptive of its results and behavior i.e., better knowledge representation.

Produce a tag that will be consistent with the page being examined and the target object type over a vast majority of site/page combinations.

The invention provides a way to provide 'version control' of the attribute tags as information changes and new types of internet standards are adopted. By using this approach to version control, an information aggregation system can save an attribute tag and continue to update and extend its capturing and publishing system. While the system evolves, the older attribute tag will continue to point back accurately to the desired information recorded earlier. Web publishers can use feature extraction tags as an 'alias' to information on a page that will allow them to identify and modify other areas on a page while maintaining the alias intact.

The invention is natural language neutral so that the software used to create an alias to an English information object can also be used to mark information objects in any language.

The list of attributes in a feature extraction object can be extended to include fuzzy patterns produced by a limited dictionary. For example, a limited dictionary for a university could include the terms: instructor, text, or fee. If these words are found within the context of a pattern match they can be included in the feature extraction attribute list. This part of the invention allows the user to develop extremely specific feature extraction objects for vertical subject domains in addition to the very general or horizontal approach used without domain dictionaries.

In embodiments of the invention, the feature tag may be used to accurately 'rank' information objects within a collection of objects in a database or on a page. For example, a page can be divided into information objects, and the user will be shown only the 'most important' objects on the page. A search engine can use this ability to do a standard lexical search and subsequently return only the most important information objects of the search results. For example, links returned by a search engine may be examined using the Feature Extraction technology of this invention to parse each search result page into atoms and subsequently score the page for its quality content. Depending on the content score, different Feature Extraction objects are used to collect data from the page. In one embodiment, a page with a high 'headline' score will be parsed and displayed using a headline capture process. A page with a high text score may be displayed using an 'article' capture object. A high graphic score may be displayed by use of a graphic capture object.

The invention provides a method and system for collecting and displaying information that has been collected from the Internet. Some embodiments are divided into the 'collection system' and the 'display system'.

The collection system allows a user to use a web browser application to navigate to a web page on the Internet and then 'mark' content. When the user desires to capture an object from the web she will enter 'navigation' mode. In navigation mode, as the user clicks on hypertext links on a page the invention process will record every action. The user will continue to navigate until he reaches the page that contains the desired target content. Once the desired content is visible within the browser the user can click on a 'stop recording' button. The system will display a number of selections to the user who may select 'Text Article', 'Images', 'Numeric Table' or 'Headlines' from the target page. If Headlines are selected, all of the headlines are collected from the page and displayed on the preview page. If Images are selected, all of the images from the page are collected and displayed on the preview page. These and other embodiments are described in greater detail herein.

DETAILED DESCRIPTION

A. The Content Collection Language

The invention includes a recursive scripting language referred to as a Content Collection Language (CCL). The content collection language is a dynamic language, in contrast to 'static' languages that have a fixed list of keywords. As such, interpretation of a dynamic language, such as the content collection language, employs only the code required for interpreting the individual commands present in a script and not the totality of commands in the language. For example, in the content collection language, interpretation of a command such as LOAD( ) does not require loading all of the unused keywords simply to execute the command, as in this case, to load a document.

In embodiments of the invention, the content collection language is implemented in the JAVA programming language from Sun Microsystems, Inc. of Palo Alto, Calif. In embodiments of the invention, the content collection language employs the capacity to instantiate a class dynamically to implement the various commands in the content collection language. Thus a command can register additional commands that it may require in its execution dynamically.

In embodiments of the invention, a script written in the content collection language may be interpreted over a distributed set of processors. For instance, a portion of a script may be executed at a client browser, while another portion of the script may be executed at a server coupled to the client via the Internet. In embodiments of the invention in which the content collection language is implemented in the JAVA programming language, a script encoded in the content collection language may be processed on any Java server, as part of one or more Java servlets.

B. Format of Commands in the Content Collection Language

The content collection language is a recursive, object-oriented scripting language. Commands and parameters in the language are treated identically, and commands are executed in the order in which they are nested. Each command is made up of three parts, the CommandName, the Params, and the NextCommand.

When each CCL_COMMAND is run it will:

Parse and save the local parameters

Parse the name of the NextCommand and instantiate the NextCommand

Pass the 'String Artifact' to the NextCommand

The following example illustrates a script in the content collection language including three nested commands:

CCL_COMMAND(param1(CCL_NEXT(param2 (CCL_LAST(param3,void)))))

This command may be viewed as it would be executed as a structured programming language:

```
CCL_COMMAND(param1(CCL_NEXT(param2(CCL_LAST
(param3,void)))))
{
    save param1
    create CCL_NEXT
    CCL_NEXT(param2(CCL_LAST(param3,void))))
    {
        save param2
        create CCL_LAST
        CCL_LAST(param3,void)
        {
            Execute CCL_LAST and
            save data values in hashtable
            RETURN hashtable
        }
        Execute CCL_NEXT using
        hashtable results from CCL_LAST
        add new data and RETURN hashtable
    }
    Execute CCL_COMMAND using hashtable results
    from CCL_NEXT and RETURN hashtable
    results to creator
}
```

Processing does not take place until all CCL_COMMANDS have been created. The 'most nested' command is processed first and returns its results to its creator. Each command is executed using the results from its 'nested child' until the final result is returned to its creator.

Commands are 'chained' to obtain specific content results:

LABEL(param1, param2, param3(LABELTWO (param2.1, param2,2( )

The result is a single string command which can be used in a manner similar to a URL to describe content anywhere on the web. To illustrate, consider a script encoded in the content collection language for retrieving a graphic from a financial news site: GRAPHIC((ANCHOR(/sandp.html (LOAD(foo_financial.com/markets/))))). This description uses three commands to capture the S&P chart from the foo_financial.com page.

LOAD reads the foo_financial.com/markets/web page

ANCHOR captures an anchor associated with 'sandp.html'

GRAPHIC reads a graphic object when passed a URL

Using a standard scripting language, the script above may be written as follows:

```
If LOAD("foo_financial.com/markets/")
{
    if (ANCHOR("sandp.html"))
    {
        return (GRAPHIC( );
    }
}
```

The content collection language executes the command that is most deeply nested first. If this is successful, the next most deeply nested command is executed until all of the commands have either returned an error message or executed successfully.

Once elementary commands are place, they can be combined algebraically to produce additional commands in the content collection language. Each command is made up of parameters, and the NextCommand to produce a third CCL command as a result. Each CCL command returns a collection of objects as a result of its parameters and the Next-Command. For example, the CCL descriptor: NEWSLIST ((LOAD(foo_news.com)) returns a 'collection' or list of all anchors separated by a delimiter that could be identified as a new's list item.

NEWSLIST((LOAD(foo_news.com))

Returns a 'collection' or list of all anchors separated by a delimiter that could be identified as a news list item.

Set operations in CCL include

Union function: All elements of collection A that contain parameter B.

Exclusion function: All elements of collection A that do not contain parameter B.

Operations possible in CCL include

BEFORE: Each element of collection A that are BEFORE parameter B.

AFTER: Each element of collection A that are AFTER parameter B.

FIRST: First element of a collection A.

FIRSTNUM: First NUMBER of collection A.

LAST: Last element of a collection A.

LASTNUM: Last NUMBER of collection A.

CCL commands all share the same error handling and behave the same way during failure, pause and retry situations.

C. Feature Extraction

The invention supports protocols and techniques for identifying information objects by use of attributes of the information objects. These protocols and techniques are collectively referred to as "Feature Extraction". A feature extraction tag or an information object comprises a number of 'fuzzy rules' or attributes describing the information object. For instance, a feature extraction tag for a graphic object could be "G0ABMMZA001". The first character of the tag 'G' defines the type of net object, with the character G being reserved for graphic object. The second character '0' defines this tag as a Graphics tag version '0' so that one can easily add or modify tags and maintain backward compatibility. The 'ABMMZA' characters describe the capture attributes, and '001' is a numeral indicating the occurrence of the graphic object on the page. In this case G0ABMMZA001 is the first occurrence of several ABM- MZA objects on the page. The attributes are ranked with the most significant attribute leftmost in the tag with 'A' being the highest value and 'Z' being the lowest value for any attribute.

Figure 1:
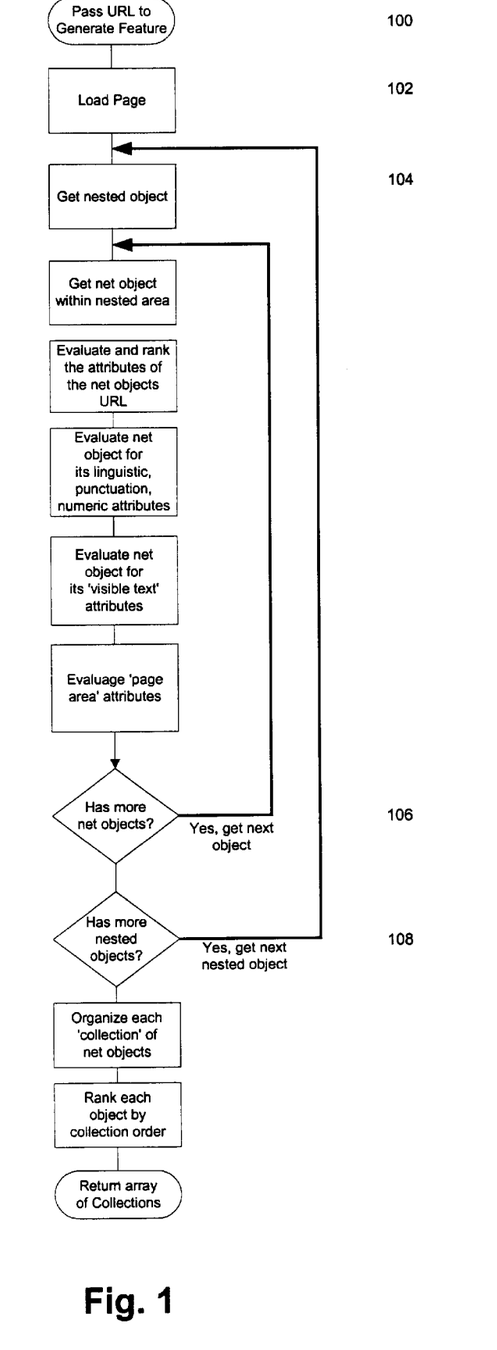
FIG. 1 is a flowchart for deconstructing a page retrieved from a network into a set of net objects.

For example, in FIG. 1, the URL of a page is passed to the feature extraction indexer. The page is retrieved from the web 102 and then each 'container object' is analyzed or parsed one at a time 104. A container object for HTML is the TABLE tag that is used for page layout. Each TABLE tag may have many tables which, in turn, have nested tables of their own. Each container (TABLE) is separated from the target page into a new data object containing only information for that particular container. As each TABLE is parsed, objects in that table are created for each element of the TABLE such as, by way of a non-limiting example, a headline, graphic object, or button. Within each of these element tags is information that is used to produce the element's feature tag. A loop is used 106 to build all element tags within a container and another loop is used to build all container tags within a page 108.

Figure 2:
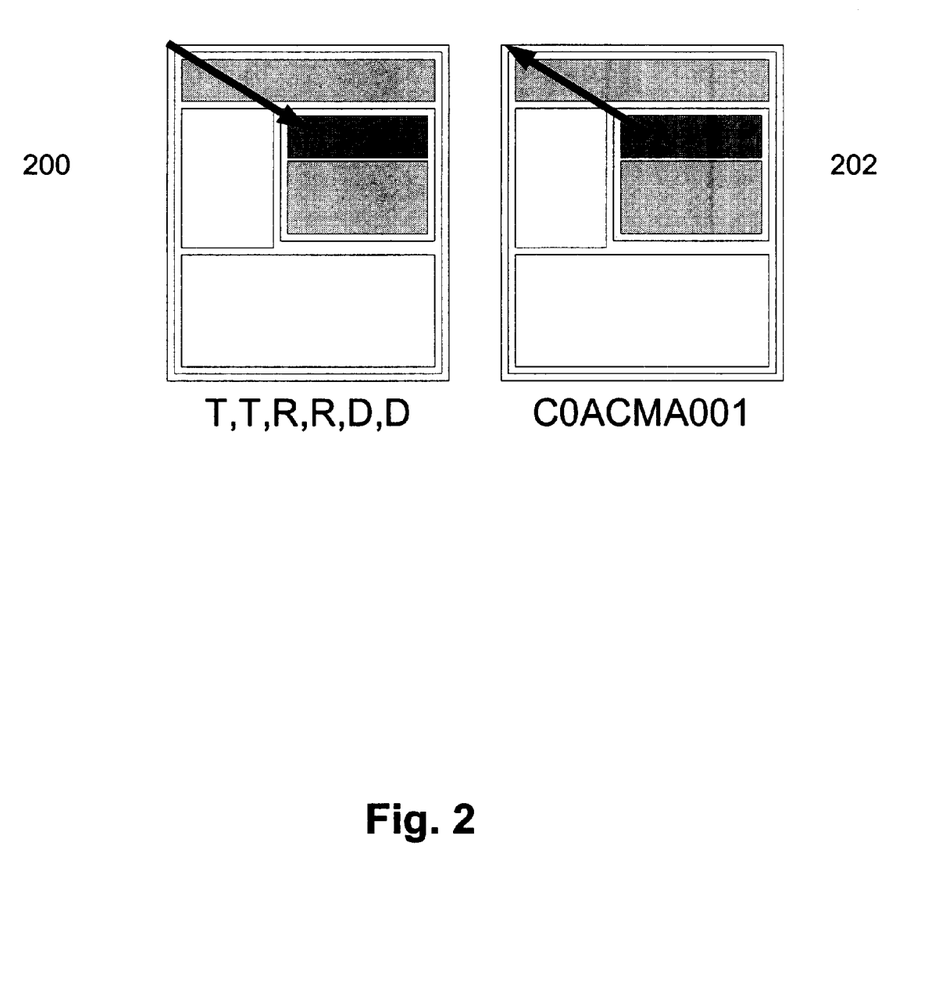
FIG. 2 illustrates an inside-out approach for building feature extraction attributes according to embodiments of the invention.

Feature extraction attributes are constructed using an 'Inside->Out' method instead of an 'Outside-In' approach. For example, FIG. 2 illustrates two pages 200, 202 with several tables. The left page 200 is tagged by building a list of table attributes from the top of the page to the desired capture target. In the approach used by this invention, illustrated on the right side of the diagram 202, the table attributes are limited to this particular table, or container, table, and its contents. The benefits of the 'Inside->Out' approach of this invention are that advertising banners or other graphics can be added to the top or the bottom of the page, and the table, with its contents, can be moved, without disrupting the identification of the desired object. As long as the contents inside the table remain structurally unchanged the correct table for a generated tag will be collected. This allows capture tags to remain useful and accurate even when the pages are being modified by the publisher. This feature of the invention is commonly referred to as 'persistence', and the approach used by this invention to mark and collect information is more 'persistent' than other approaches in the prior art.

Feature extraction objects can be used to capture discrete net objects on a page such as a headline, graphic image, or button. Tags are also generated for distinct areas on the page, which may be a single container (TABLE), or an area made up of several nested containers.

Feature extraction tags can be combined to create more accurate and persistent tags for very complicated web pages. For example a container tag can be combined with any element tag (graphic, headline, form, etc) to produce a very accurate extraction tag even for the most crowded of pages. In embodiments of the invention, the fuzzy logic of the attributes are used to extract an object using not only the content of the element itself (headline, graphic, button) but also the context of the element on the page. Situations where this is especially powerful is on very dense pages, such as a news portal, where there may be a large number of headlines that have very similar attributes. Another situation where the above technique can be used to retrieve data on the base of context is when extracting column and row data from a 'spreadsheet' type of document on a page that has several 'spreadsheet' displays of data. When creating the feature extraction tag, one may choose between a simple 'element' tag or a 'compound' tag, made up of a container tag and a element tag, depending on the page and the object being captured.

Figure 3:
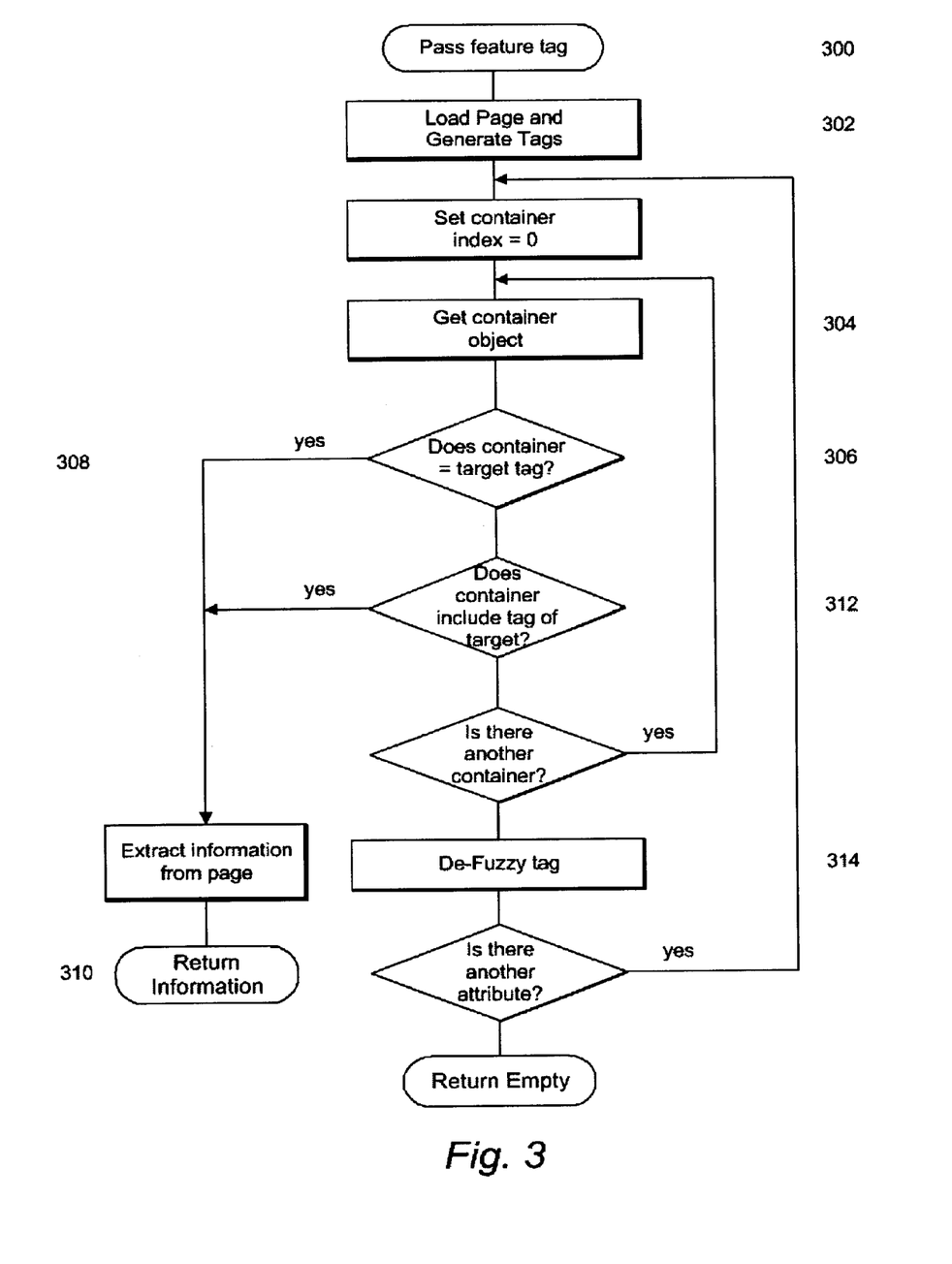
FIG. 3 illustrates a flow chart for identifying previously saved feature extraction objects.

The information retrieval processes of the present invention use tags that have been generated previously to load a page of information and subsequently extract the desired information defined by the tag. Such a process is illustrated in FIG. 3. The URL of a page is passed with a 'target' tag to the feature extraction indexer 300. The page is retrieved from the web 302 and then each 'container object' 304 is parsed one at a time. Each container is examined to see if 'this container tag' equals the 'target' tag 306. If this container matches the target 308 then the information within this container is returned to the caller 310. Next, the container is examined to see if the target tag is an element within that particular container 312. If an element matches the target tag, then that element's information is returned to the caller. If all containers on a page are examined without a match being found, this invention makes it possible to find the 'nearest' object if an 'exact' object match is not found. This is done by a 'de-fuzzy' search 314 from the least significant (rightmost) attribute to the most significant (leftmost) of the attributes in a tag. For example, if an exact match was not found for the tag G0ABMMZA001 the search would look for:

G0ABMMZB001,
G0ABMMZC001,
G0ABMMZD001,
G0ABMMZE001,
G0ABMMY*001,
G0ABMMX*001,
G0ABMMV*001,
,
,
,
G0AB***001

In effect, one searches right to left for the best fit, narrowing the search on the most significant attributes. The information retrieval module can be tuned for different solutions to provide very fine or very coarse fuzzy match of the tag to the target held. The tag notation of this invention also makes it possible to use wildcards to get all of the graphics from a page with a tag of "G0ABMMM**", and operators such as get all of the tags 'greater than'> G0ABMMZA.

The Feature Extraction object has a 'getContainer( )' method that will return any element's container. This feature is used on the 'zoom-out' so the user can select the content (graphic, headline, button) or the desired context (area) at the same time. By passing a container tag, the target tag container's container will be returned. For example, in FIG. 4, the URL of a page is passed with a 'target' tag 400 to the feature extraction 'getContainer( )' method.

Figure 4:
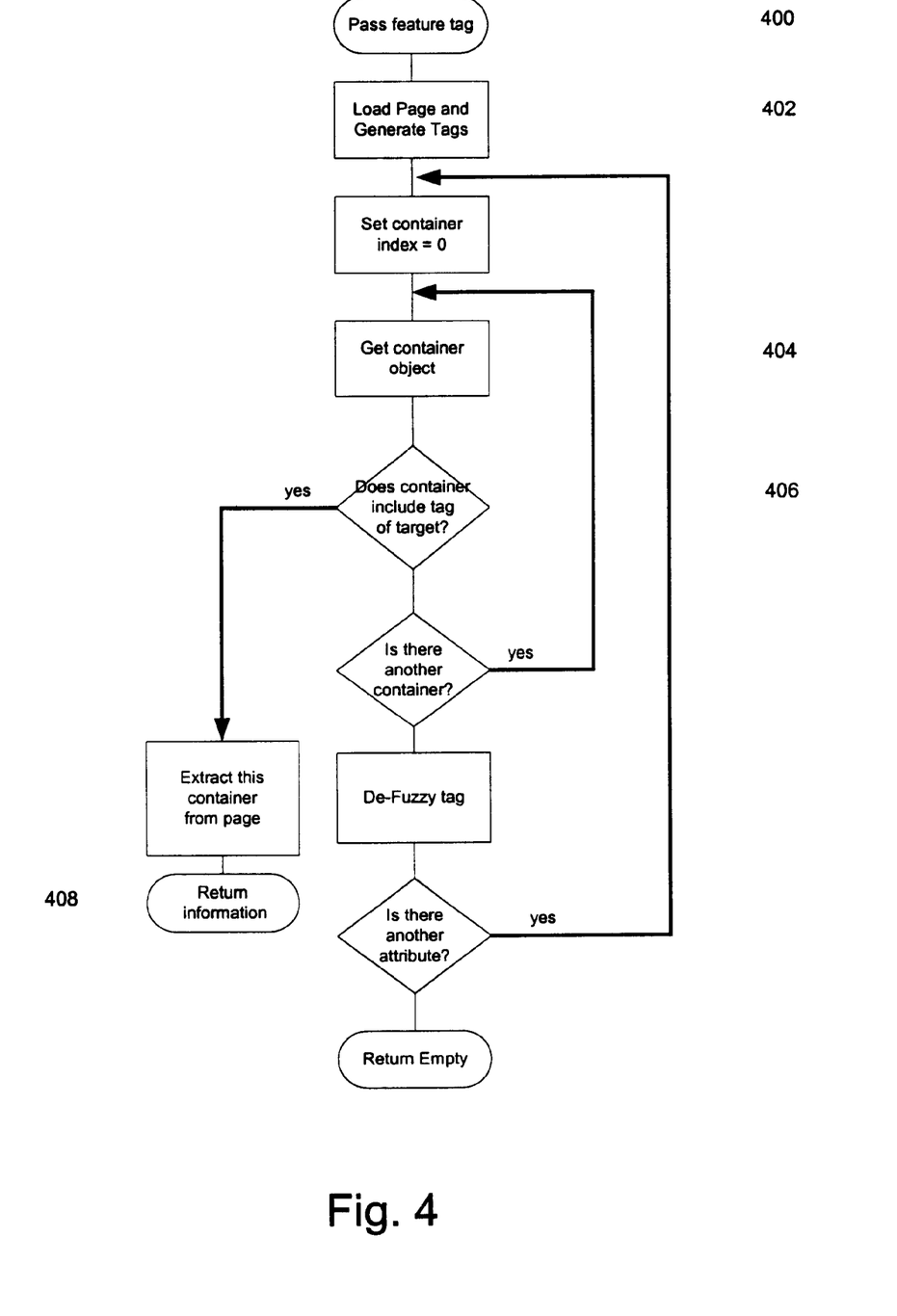
FIG. 4 is a flowchart for identifying a best-fit feature extraction object according to embodiments of the invention.

The page is retrieved from the web 402 and then each 'container object' is parsed one at a time 404. Each container is examined to see if the target tag is an element or a nested container within that particular container 406. If an element or nested container matches the target tag then that container's information is returned to the caller 408. If all containers on a page are examined without a match, the 'nearest' object's container is returned.

This invention may also be used to 'post-process' information in order to filter out undesired content from an otherwise good information retrieval. For example, a headline capture tag that collects all of the major headlines on a popular web site may have some 'navigation' or 'site related' elements within that capture that are not desired when this information is added to an aggregated collection of headlines from multiple sites. Some examples of visible text that would not be desired when doing headline aggregation would be: "show more", "click here", "email to", etc. To subtract these kinds of text from a headline capture the following tag may be used:

L0TTTTTTTTTTT003HHHHHHHaaaaaaabbbbbbb

In this example, L0 is the headline tag list, TTTTTTTTTTT003 is the area in which the headlines are to be captured from, HHHHHHH is the tag for the desired headlines, and aaaaaaabbbbbbb instruct the indexer to remove headline type aaaaaaa and bbbbbbb from the collection. In other words, collect headlines HHHHHHH and remove from that capture headlines with a tag or aaaaaaa and bbbbbbb.

D. System Architecture

Figure 5:
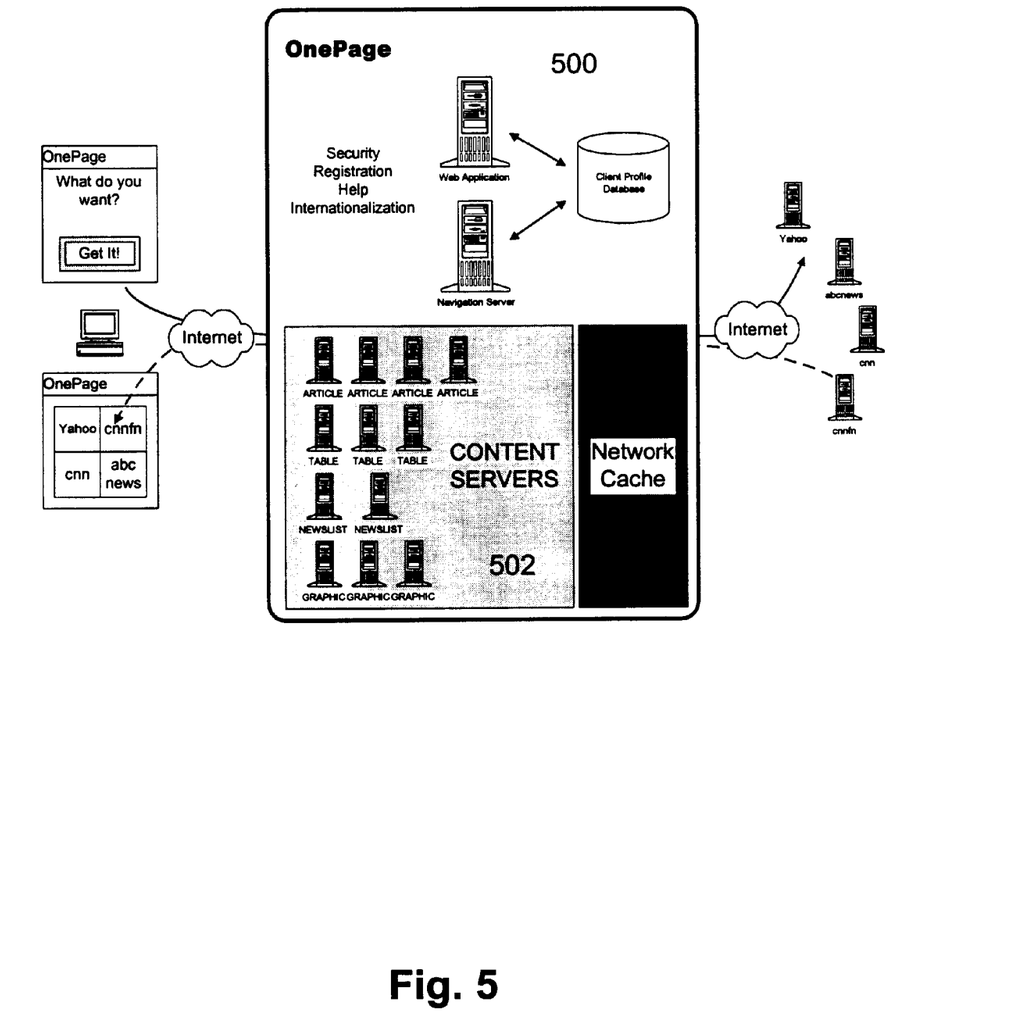
FIG. 5 illustrates a system architecture for an information retrieval system.

FIG. 5 illustrates the 'portal' 500 and 'content' 502 servers used in embodiments of the invention. User registration, password security, and internationalization is served by the portal server 500. The top part of the diagram represents the 'portal' server 500, with the 'content' servers 502 in the lower half. In embodiments of the invention, each 'content' server is as simple as possible and does not require access to the database with each content server specialized for a specific collection function, GRAPHIC, ARTICLE, NEWLIST, TABLE.

Figure 6A:
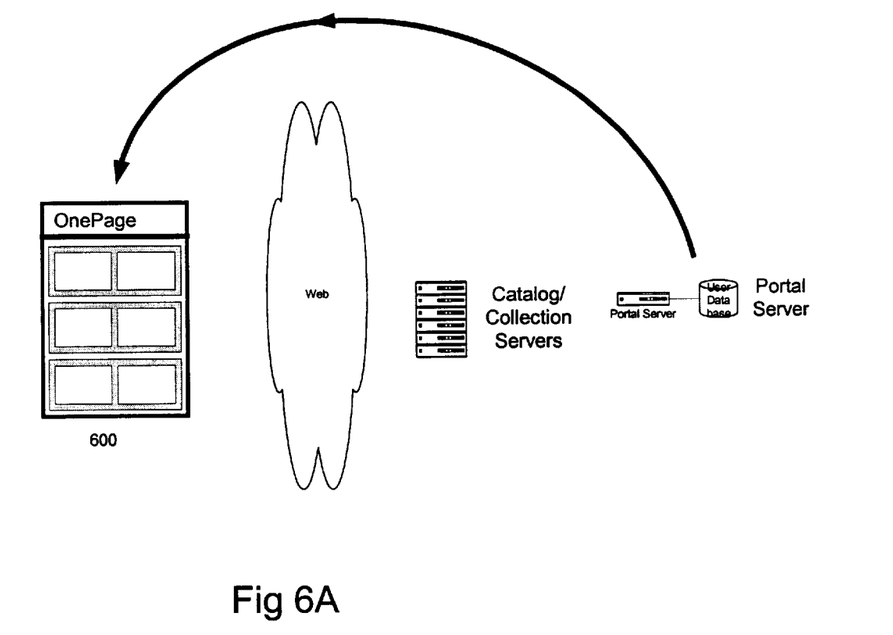
FIGS. 6A–C illustrate a system architecture for retrieving multiple data sources into a single web page.
Figure 6B:
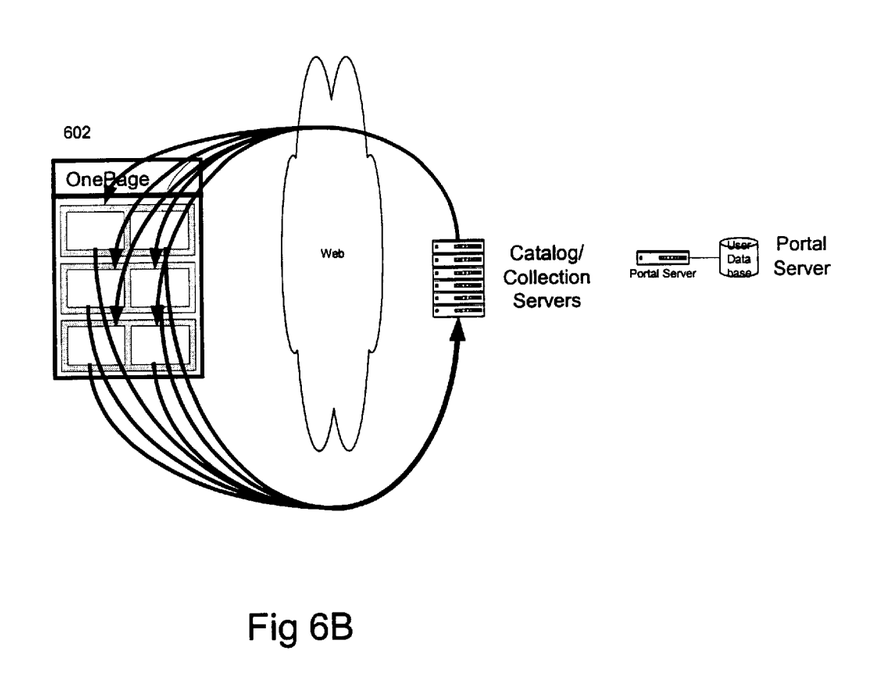
Figure 6C:
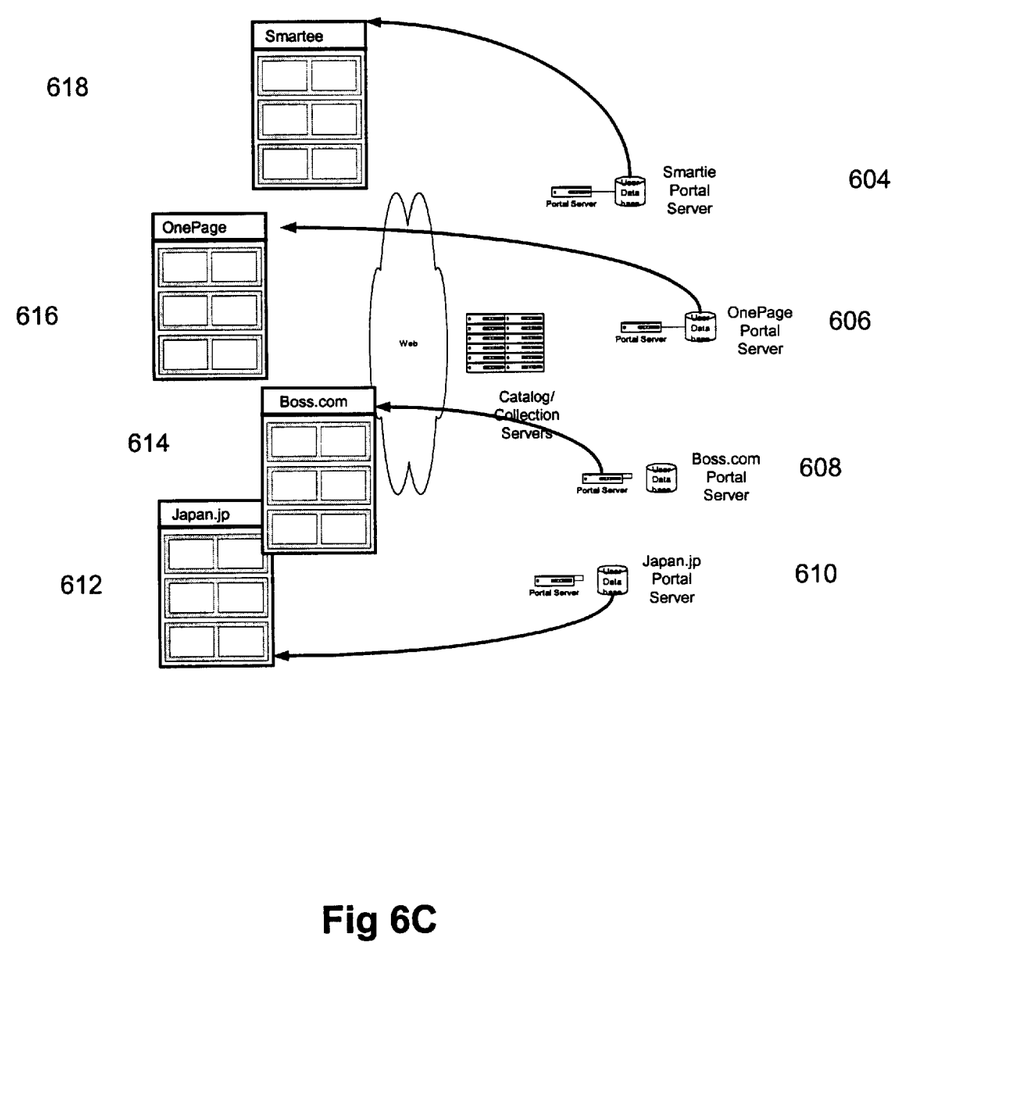

FIGS. 6A–B illustrate the process of delivering information in parallel. As the user togs into his account, a page is sent to the client web browser 600. The web page 600 does not contain all of the collected content when it is first drawn but will have a reference 602 to each 'webpart' to be collected in the window. These references are sent back to a cluster of content servers. Each content server is specialized to collect content quickly from each target site. In embodiments of the invention, the information is requested from each target site and then sent immediately to the user's web page without being saved in a server database, cache, or repository. By separating the main page creation from the collection and delivery of information, this invention makes it possible to combine information from several sources residing on many different servers without delaying or halting the display of the main page. If an information source is unavailable, has a network error, or if the information source page has been redesigned, the rest of the main page will be displayed without interruption. The separation of the main page server from content servers also makes it possible for several 'branded' servers 604, 606, 608, 610 to share the same content collection servers 612. Another advantage of this specialized server architecture is the ability to serve information to another portal server that is separated by physical distance and network address. For example, the four different portal servers 604–610 illustrated in FIG. 6C can be located across the world and have different user interfaces, languages, and features. The user main page 612, 614, 616, 618 may look completely different from each of the portal servers 604–610 but the information servers will collect and deliver requested information using the same rack of collection servers, which may be located anywhere and shared by all configured portal servers 500.

Figure 7:
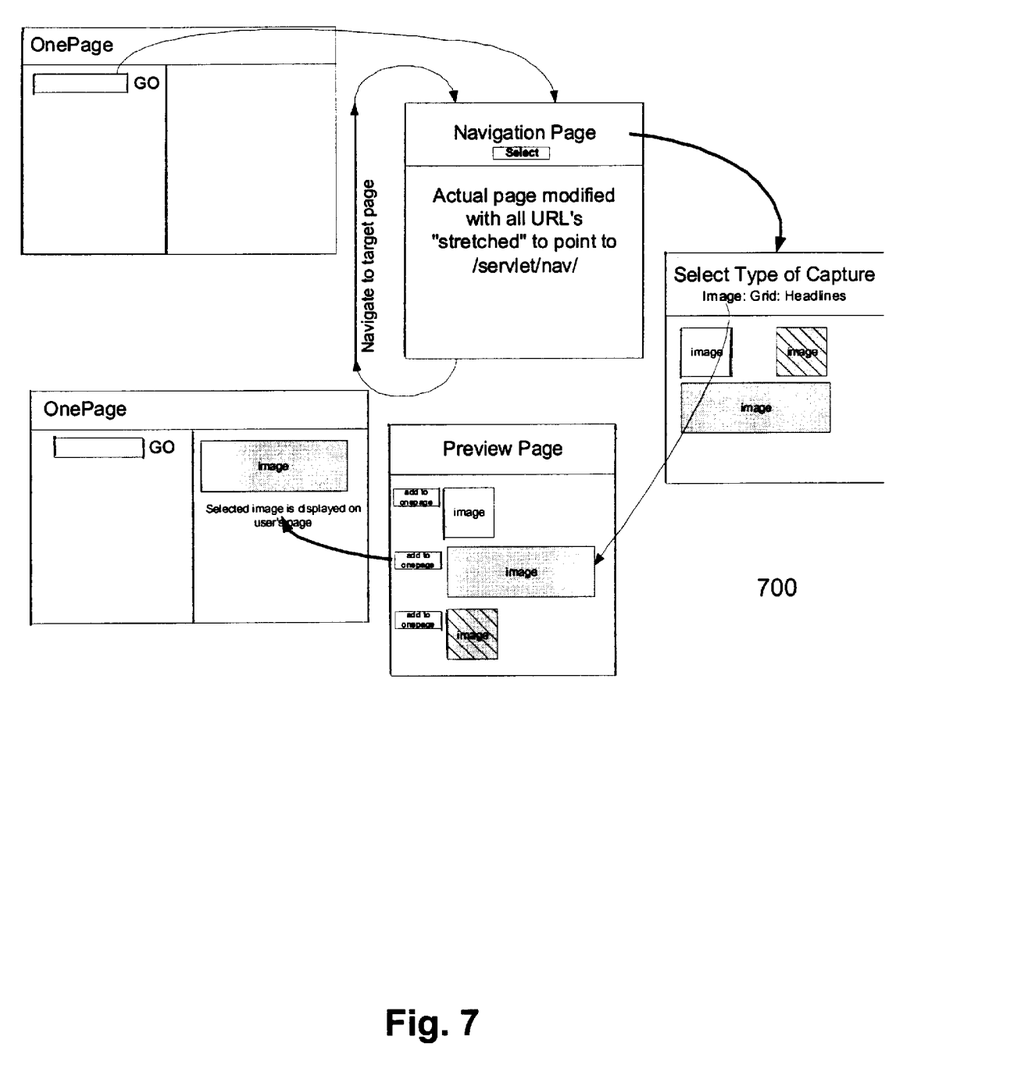
FIG. 7 illustrates a method of selecting information from websites for future retrieval.

Adding new information to a user's page can be accomplished by using this inventions 'mark and collect' process 700, as illustrated in FIG. 7. After the user logs in to the portal server, he can begin 'recording' the path to a desired net object by entering the start URL at a prompt window. During marking and navigation the user's browser screen is divided into two parts: the top frame contains a 'stop recording' button and the lower frame on the screen displays the first page requested. The user is now in 'navigation' mode.

Figure 8:
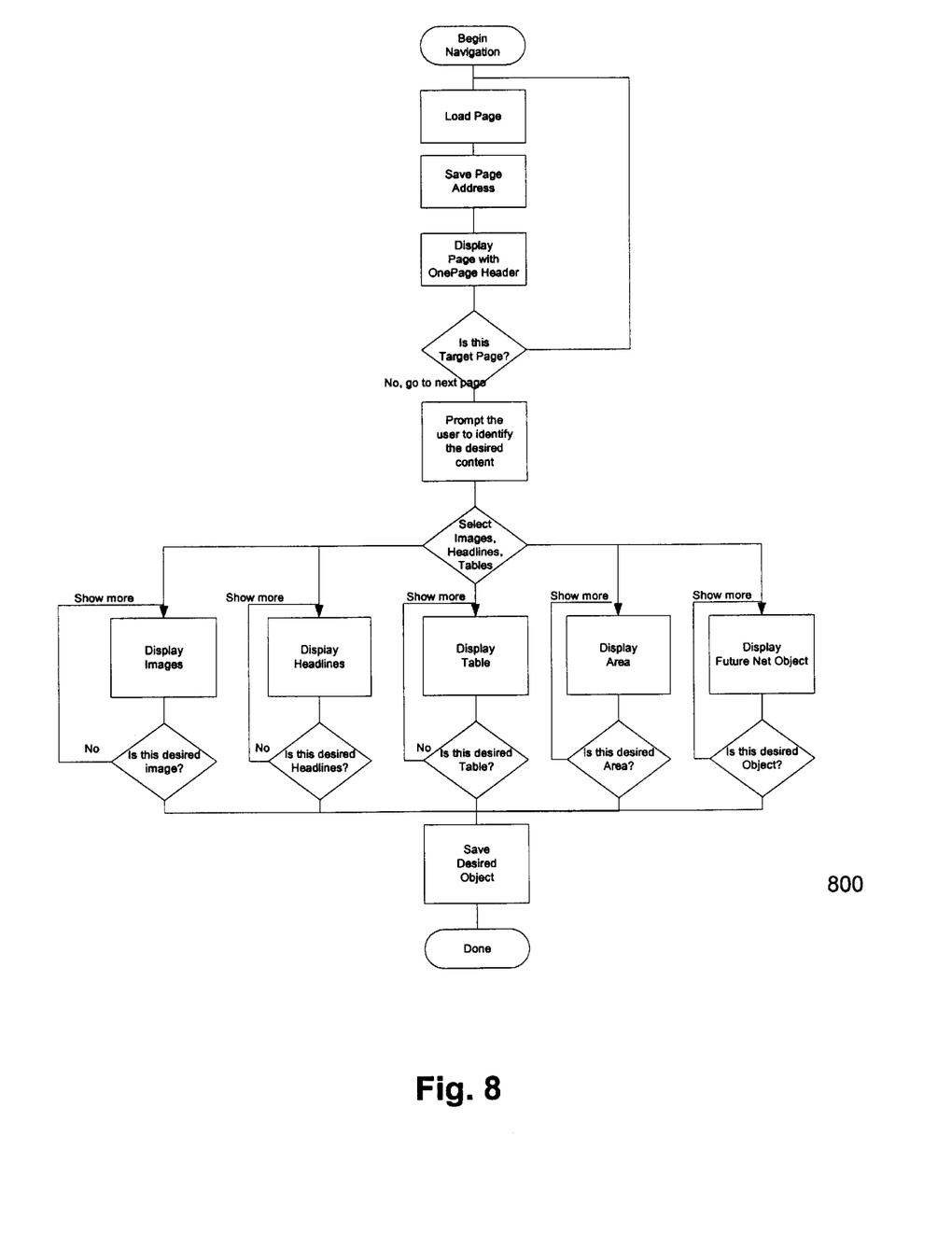
FIG. 8 is a flowchart for identifying desired objects distributed over a target page.

During navigation mode, illustrated in flowchart 800 of FIG. 8, every hypertext link on the page is modified by the content server. When a hyperlink tag is clicked on, the page request is sent back to the navigation server providing a record of every user action. The user will continue in 'navigation' mode until the page is reached containing the desired collection object. This process allows the user to 'drill down' many pages deep into a web site looking for the desired target information. This process also makes it possible to save all of the 'web parameters' necessary to reach the target information again without user intervention. For example, username, password, and other items such as search criteria are all monitored and saved during navigation to be used to recollect the information again mechanically and quickly by the collection server. This process also makes it possible to save all of the 'web parameters' necessary to reach the target information again without user intervention. For example, username, password, and other items such as search criteria are all monitored and saved during navigation to be used to recollect the information again mechanically and quickly by the collection server.

When the page containing the desired information target object is viewed, the user will click on the 'stop' button. The 'content' server will send a page to the user prompting a selection of the desired information he wishes to collect from the page. The user is engaged in a dialog to accurately identify the item or items on the page to collect. If needed, the software prompts the user for 'parameter' information such as 'search criteria' or 'address information' need to replay the in formation request later.

The content server will extract all objects or the desired page and present those objects on a 'preview' page. In embodiments of the invention, each object is evaluated before it is displayed so that the 'most valuable' information objects are displayed first. For example, the largest graphic object that is located in the center of the page will be displayed first on the preview page. The preview page will show the desired objects allowing the user to choose the object to send to his user page.

By clicking on the 'add to page' button the information target reference is sent back to the portal server 500 where it is saved as part of the user's page definition. The next time the page is updated, the portal server 500 will send the user's page to the browser and the browser will request the new information object as one of many objects collected in parallel in real-time by the content servers.

E. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method of parsing a script encoded in a recursive scripting language, wherein the script is at least partially parsed in a first server coupled to a wide area network, the method comprising:

parsing a first command in the script, the first command including a first operand, wherein the first operand is a Uniform Resource Locator (URL), such that the first command corresponds to a load operation; after parsing the first command, retrieving a network resource corresponding to the URL from the wide area network;

storing the network resource in a first hashtable;

returning the first hashtable to a second command in the script, wherein the first command is nested within the second command;

parsing the second command;

executing the second command, further including storing results of the second command in a second hashtable; and returning the second hashtable to a third command in the script, wherein the second and first commands are nested within the third command.

2. The method of claim 1, wherein the network resource is encoded at least partially in a first markup language.

3. The method of claim 2, wherein the network resource is encoded at least partially in a second markup language.

4. The method of claim 3, wherein the first and second markup languages are HTML and XML, respectively.

5. The method of claim 2, wherein the first markup language is HTML.

6. The method of claim 2, wherein the first markup language is XML.

7. The method of claim 1, wherein the wide area network is the Internet.

8. The method of claim 1, wherein the parsing the first command occurs in the first server.

9. The method of claim 8, wherein the parsing the second command occurs on a second server, the second server in communication with the first server and the wide area network.

10. The method of claim 9, wherein the network resource is at least partially encoded in a markup language.

11. The method of claim 10, further comprising:

executing the second command, executing the second command further including retrieving a graphic object from the network resource.

12. The method of claim 10, further comprising:

executing the second command, executing the second command further including retrieving a headline from the network resource, the headline encoded at least partially in the markup language.

13. The method of claim 10, further comprising:

executing the second command, executing the second command further including retrieving one of a table from the network resource.

14. The method of claim 10, further comprising:

executing the second command, executing the second command further including retrieving one of a form from the network resource.

15. The method of claim 1, wherein the network resource is at least partially encoded in HTML.

16. The method of claim 1, wherein the network resource is at least partially encoded in XML.

* * * * *